United States Patent
Walker

[11] 3,717,370
[45] Feb. 20, 1973

[54] TIRE WATER BUMPER

[76] Inventor: Brooks Walker, 1280 Columbus Avenue, San Francisco, Calif. 94133

[22] Filed: July 30, 1971

[21] Appl. No.: 167,584

Related U.S. Application Data

[62] Division of Ser. No. 888,421, Dec. 29, 1969, Pat. No. 3,664,653.

[52] U.S. Cl. ................................293/1, 293/71 R
[51] Int. Cl. ................................B60r 19/10
[58] Field of Search .......293/1, DIG. 2, 63, 69, 71 R, 293/73, 98

[56] References Cited

UNITED STATES PATENTS

| | | | |
|---|---|---|---|
| 3,502,362 | 3/1970 | Eshelman | 293/19 |
| 3,588,158 | 6/1971 | Ford | 293/71 R |
| 3,512,822 | 5/1970 | Rich et al. | 293/1 |
| 1,330,102 | 2/1920 | Walker | 293/69 R |
| 1,350,897 | 8/1920 | Trammell | 293/69 R |
| 1,672,335 | 6/1928 | O'Meara | 293/69 R |

*Primary Examiner*—Gerald M. Forlenza
*Assistant Examiner*—Robert Saifer

[57] ABSTRACT

This invention pertains to an energy absorber for use on abutments or on the front of vehicles to absorb energy when the vehicle abuts against another vehicle or a vehicle abuts against an abutment such as a divider between two roads, highways or freeways, a bridge support, a guard rail end, a bridge rail end, a sign support, a pole, etc.; the absorber to be composed of one or more tires, new or used, and filled with a liquid such as water (with salt, etc., to prevent freezing in cold climates) and with one or more blow out plugs to allow the liquid to escape when impacted, the ends or rim sides of the tires being closed and connected by flexible or collapsible means.

7 Claims, 4 Drawing Figures

PATENTED FEB 20 1973
3,717,370
FIG_1
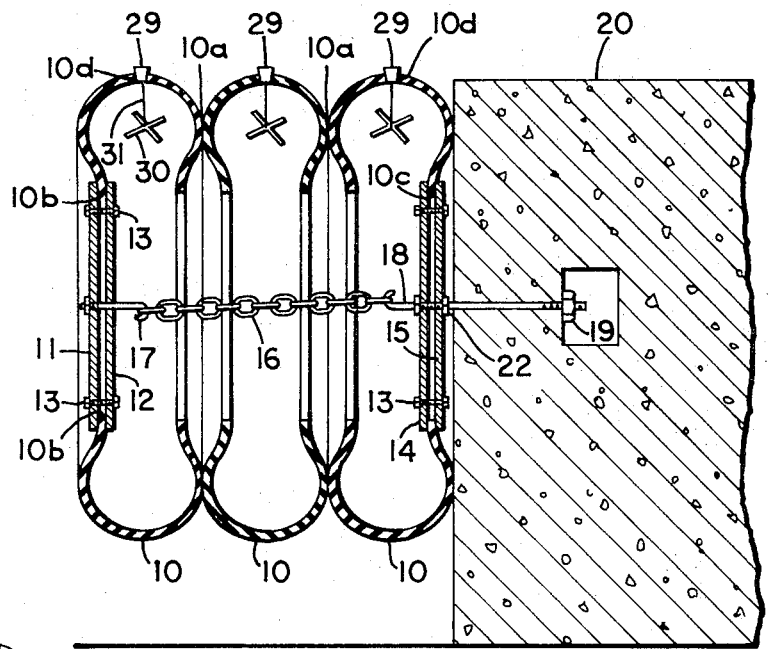
FIG_2
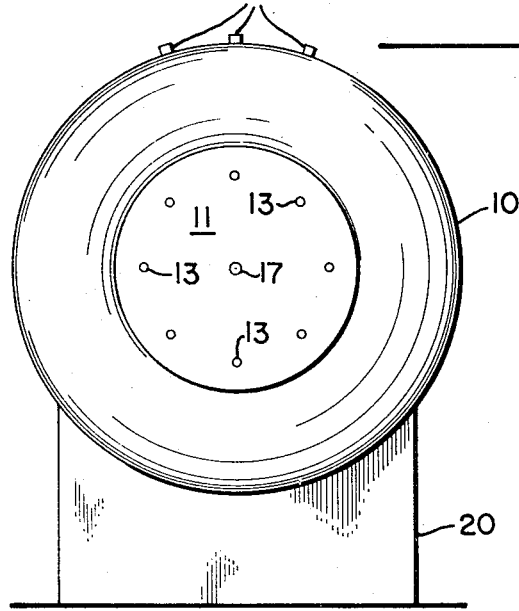
FIG_4
FIG_3
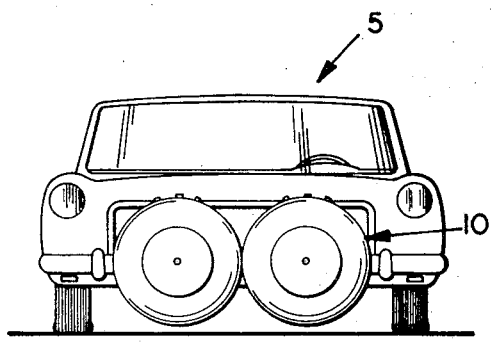
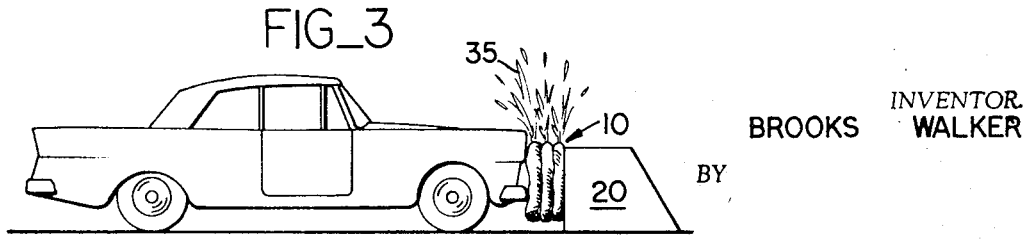
INVENTOR.
BROOKS WALKER
BY

TIRE WATER BUMPER

This application is a division of Ser. No. 888,421, filed Dec. 29, 1969, now U.S. Pat. No. 3,664,653 for Energy Absorber.

An object of the invention is as stated in the above summary.

Another object is to use inexpensive used tires secured together as by cementing the sides together or vulcanizing them together, closing the rim opening at each end of the combination of the tire casings for a liquid tight seal and cutting one or more holes in the top of the tires, plugging these holes with blow-out plugs, and attaching the combination to an abutment to absorb energy of a vehicle butting the abutment thus reducing or eliminating damage to the vehicle and its occupant depending on the mass of the vehicle, the velocity of impact and the energy absorbent quality of the combination.

Another object is to use one or more such tires with collapsible (towards each other) closures for the rim openings on each side of a single tire or on the outside closures of the rim openings on the outside edges of a group of attached tire energy absorbers and attaching such tires to an abutment or to the front of a vehicle for energy absorption.

Another object is to find a good use for tires too worn for car support as very effective energy absorbers in case of an accident.

Other objects will be more particularly pointed out in the accompanying specification and claims.

I have illustrated my invention in the accompanying drawings, in which:

FIG. 1 shows a cross section of one form of the invention taken in a vertical plane through the center of the tire energy absorber.

FIG. 2 shows an elevation view of the same absorber attached to an abutment.

FIG. 3 shows a vehicle butting the same energy absorber and the liquid being ejected.

FIG. 4 shows another absorber attached to the front of a vehicle.

In all figures like numerals of reference refer to corresponding parts.

In FIGS. 1 through 4, I have shown a series of vehicle tires 10 secured to each other at their sidewalls 10a by cement or vulcanizing or other suitable means. The rim opening 10b on one of the tires 10 is closed by two discs 11 and 12 which are secured together by bolts 13. Rim opening 10c at the other end of the pile of tires 10 is likewise closed by discs 15 and 14 or other suitable closures.

These discs 11 and 12 at one side are secured to discs 14 and 15 at the other side of the pile of tires 10 by a collapsible tightener such as chain 16 secured to hook bolts 17 and 18. Chain 16 could be a cable or other tie that would not seriously obstruct the collapse of the water filled tires on sufficient impact as by a car running into the abutment 20 to which the combination of tires are suitably attached as by bolts 22 to disc 14. Each tire 10 has one or more holes in the top, such as 10d, closed by a blowout plug 29 which may be attached to a cord 31 and a retainer 30 that does not easily go through holes 10d in tires 10, nor does retainer 30 obstruct seriously the rapid flow of liquid 35 from the holes in tires 10 after a substantial impact. The absorber is attached to abutment 20 by nut 19 on bolt 18.

In FIG. 4 the pile of tires is attached to the front of a vehicle 5 in the same manner as attached to the abutment as shown in FIG. 1. In such a case only one tire may be sufficient considering the over all length limitations. Two or more small diameter tires attached to a back-up bumper may be more durable than tires nearly the same size as those on the vehicle wheels.

In operation, when there is an impact between a vehicle with such an absorber the liquid 35 will be forced out through the openings 10b and the resistance to flow is in proportion to the velocity and velocity is proportional to the square of the pressure, some energy will be absorbed while the tires are deflected to build up pressure in the liquid 35 and more as the liquid 35 is forced out the openings 10b. The greater the force of impact the greater the velocity of liquid ejected from holes 10b and the more absorption per inch of compression.

I have illustrated my invention in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. An energy absorber for a vehicle comprising,
   a pneumatic tire casing having an aperture through its peripheral wall portion, said casing having a circular rim opening in each side wall thereof,
   a separate and discrete closure means on each side of said casing and spaced from each other for closing said rim openings to enclose, liquid-tight, a volume of liquid substantially filling said casing,
   a blowout plug normally tightly seated in said aperture and ejectable by hydraulic pressure upon application of a predetermined force against said casing,
   and means for securing said casing to one end of a vehicle.

2. An energy absorber in accordance with claim 3 wherein said casing is secured with its sides substantially normal to the path of movement of the vehicle.

3. An energy absorber according to claim 2 wherein said blowout plug is located on the upper periphery of the casing.

4. An energy absorber in accordance with claim 3 wherein at least one of said closure means comprises a pair of discs secured together in opposed relation with the wall of one rim opening between the discs.

5. An energy absorber in accordance with claim 4 wherein said casing is secured to the vehicle with its sides substantially normal to the path thereof.

6. An energy absorber in accordance with claim 5 wherein at least one of said closure means comprises a second pneumatic tire casing secured in side-by-side relation to the first mentioned casing and having a rim opening in each of its side walls,
   said second casing having a closure means closing its outer rim opening to enclose liquid tight, a volume of liquid substantially filling said casing,
   said second casing having an aperture through its peripheral wall portion and a plug within the aperture ejectable by hydraulic pressure of the liquid upon application of a predetermined force against said second tire casing.

7. An energy absorber according to claim 6 wherein the adjacent rim openings of a pair of tire casings secured in side-by-side relation are free for flow of the liquid therebetween.

* * * * *